Feb. 6, 1962 M. J. EIDEN 3,019,784
THERAPEUTIC MASSAGE CUSHIONS
Filed May 18, 1959 2 Sheets-Sheet 1
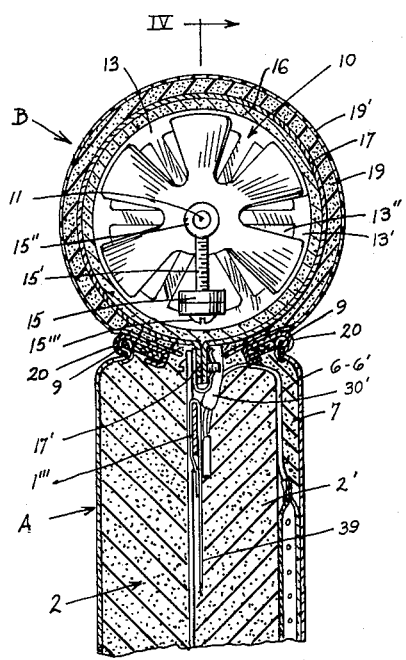
INVENTOR.
MURLYN J. EIDEN
BY
Reuben J. Carlson
Attorney Feb. 6, 1962 M. J. EIDEN 3,019,784
THERAPEUTIC MASSAGE CUSHIONS
Filed May 18, 1959 2 Sheets-Sheet 2
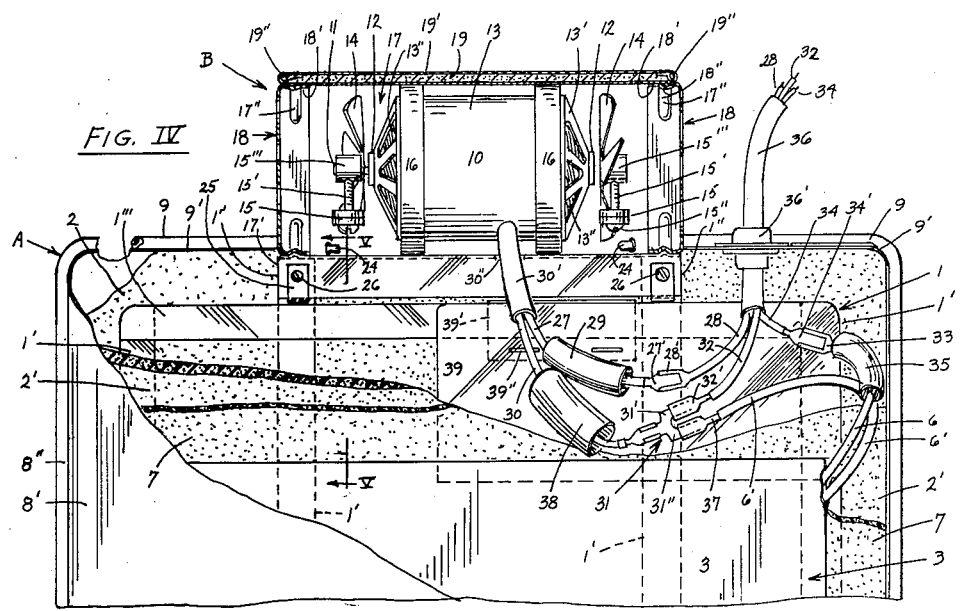
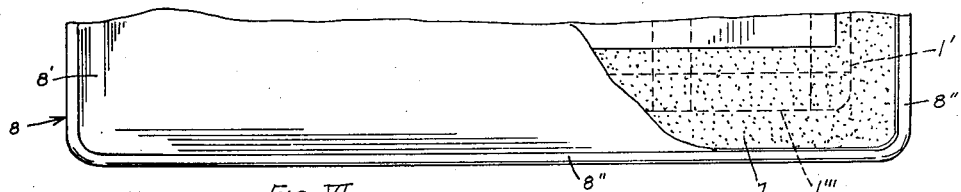
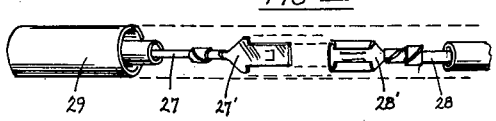
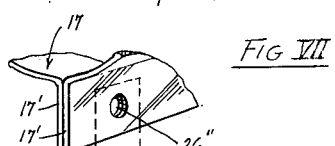
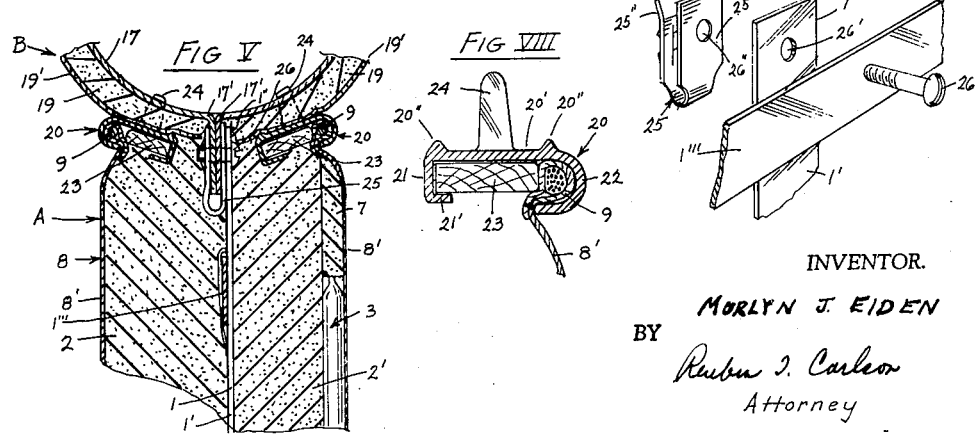
INVENTOR.
MORLYN J. EIDEN
BY
Reuben J. Carlson
Attorney

United States Patent Office

3,019,784
Patented Feb. 6, 1962

3,019,784
THERAPEUTIC MASSAGE CUSHIONS
Murlyn J. Eiden, Silver Creek, N.Y., assignor to Niagara Therapy Manufacturing Corporation, Adamsville, Pa., a corporation of Delaware
Filed May 18, 1959, Ser. No. 813,781
9 Claims. (Cl. 128—33)

This invention relates to therapeutic massage cushions, and more particularly to a cushion assembly in the form of a pad, cushion, mattress or mattress pad comprising a motion transmitting member or grid compactly sandwiched between a pair of highly resilient slabs contained in a snug fitting outer covering, and a vibration transmitting power unit such as a gyratory motor encased within a supporting shell to provide a motor assembly which may be detachably connected to one end of the vibratory motion transmitting member of the cushion assembly.

This invention is particularly directed to a motor assembly and cushion assembly structure which may be detachably connected in a manner to facilitate removal of the gyratory motor from the assembly for repair or replacement. The cushion assembly includes a motion transmitting member or grid which is relatively flexible in directions normal to the plane thereof, but relatively inflexible in direction parallel to the plane thereof. The motion transmitting member is snugly sandwiched between cushioning slabs formed of highly resilient material such as cellular or foamed rubber latex or foamed synthetic rubber. This invention also comprehends the provision of a heating pad positioned on the outside face of one of the cushioning slabs and surrounded by a resilient frame of foamed rubber latex or foamed synthetic rubber. The resilient cushioning slabs and the motion transmitting member sandwiched therebetween, as well as the heating pad and surrounding cushioning frame, are compactly encased within a snug fitting envelope covering formed from relatively non-stretchable upholstery material, which maintains the resilient cushioning slabs under moderate compressive pressure.

The motor assembly preferably comprises a variable speed gyratory motor which operates on either direct or alternating current and whose rotor shaft is supported by self-aligning bearings mounted on the end walls of the stator casing. An air circulating fan is fixed to one or both projecting ends of the motor shaft. Motor unbalancing counterweights are also fixed to one or both ends of the rotor shaft, which produce a rotor unbalance well in excess of any unbalance resulting from inaccuracies of manufacture, and which causes the motor casing to prescribe an elliptical path of motion which is imparted to the vibration transmitting member sandwiched between the resilient cushioning slabs of the pad assembly.

This invention comprehends the provision of a motor containing shell formed from a sheet of flexible metal which is covered by a resilient blanket and an upholstery covering, and which presents a pair of flange portions which can be drawn together so that the arcuate section of the shell snugly embraces resilient elements or rings surrounding the motor casing, to thereby provide the sole support for the gyratory motor contained therein. The ends of the tubular shell as thus formed are closed by end closures, each presenting a generally circular flange portion having ribs or indentations therein which cooperate with the corresponding ribs or indentations presented by the arcuate section of the motor containing shell.

This invention further comprehends the provision of means for detachably securing the flange portions of the motor containing shell to the adjacent end of the vibration transmitting member which is readily accessible at one end of the pad or cushion assembly. This invention further comprehends the provision of means for detachably connecting the upper ends of the side panel sections which form the envelope covering for the cushion assembly, directly to the motor assembly.

This invention further comprehends the provision of terminal prongs associated with the terminal ends of the motor lead wires and the heating pad lead wires, which may be conveniently connected and disconnected to socket connectors associated with the terminal ends of the power current input wires. These terminal prongs and socket connectors are contained within the upper end of the cushion assembly, but are readily accessible when the motor containing shell is disconnected from the vibration transmitting member of the pad assembly.

In attaching the motor assembly to the pad assembly, the gyratory motor and associated air circulation fans and counterweights fixed to the shaft thereof, are positioned within the outflared motor containing shell, the end closures applied, and the flange portions of the motor containing shell then pressed into abutment and so held as by Tinnerman nuts. The terminal prongs of the motor lead wires and the heating pad lead wires may then be readily connected to the socket connectors of the power input wires contained in a tubular conduit inserted through a fitting collar supported by the upper end of the envelope covering of the pad assembly.

The socket connectors of the current input wires are readily accessible through an open gap presented at the upper end of the casing covering, so that these electrical connections can readily be made. The abutting flange portions of the motor containing shell are then secured as by screws to the upper end of the vibration transmitting member of the pad or cushion assembly. The adjacent upper ends of the side wall panel sections which form the outer covering of the cushion assembly, are provided with rolled beads designed to be pocketed within a pair of locking ferrules of channel shaped form fixed to the outer face of the motor containing shell, and these bead formations locked therein by wedging splines inserted through one of the open ends of the channel shaped ferrules.

As thus assembled, the motor containing shell of the motor assembly is rigidly connected to the vibration transmitting assembly, with all wiring connections made to provide the power to operate the gyratory motor and supply the current for the heating pad. The side panel sections forming the envelope covering of the pad or cushion assembly are also tautly drawn over the adjacent faces of the resilient cushioning slabs contained therein.

When the gyratory motor is to be removed for repair or replacement, the wedging splines are withdrawn from the locking ferrules, the flange portions of the motor containing shell disconnected from the vibration transmitting member contained within the cushion assembly, and the terminal prongs of the motor lead wires and the heat pad lead wires then disconnected from the terminal socket connections of the power input wires. The flange portions of the motor containing shell are then separated, as by removal of the Tinnerman nuts which hold the flange portions in abutment, which permits the tubular body section of the motor containing shell to be outflared in a manner to permit ready removal of the motor unit.

Motor assemblies and pad or cushion assemblies constructed in accordance with this invention greatly facilitate repair of any worn out or defective parts, and particularly the repair or replacement of the gyratory motor which has a more limited life than the pad or cushion assembly. As thus constructed, the necessity of returning the entire therapeutic cushion to the factory for repair is often obviated, and permits the re-insertion of a replacement gyratory motor in the field by an unskilled workman, with the assurance that the therapeutic and massage effectiveness of the unit will not be impaired when a replacement motor is substituted for the worn or defective motor in the field by an unskilled workman.

Other objects and advantages of this invention will become apparent as the disclosure proceeds.

Although the characteristic features of this invention will be particularly pointed out in the claims, the invention itself, and the manner in which it may be carried out, may be better understood by referring to the following description taken in connection with the accompanying drawings forming a part hereof in which:

FIG. I is a perspective view of a therapeutic pad or cushion unit embodying the present invention and comprising a pad or cushion assembly and a motor assembly detachably secured in operative position to the cushion assembly;

FIG. II is a longitudinal section of the therapeutic unit as the same would appear when viewed along line II—II of FIG. I;

FIG. III is a perspective view of the motor assembly and the adjacent fragmentary part of the cushion assembly, this view showing the wedging splines withdrawn from the locking ferrules of the motor assembly, to further illustrate the manner in which the motor assembly is detachably secured to the adjacent end of the cushion or pad assembly;

FIG. IV is a fragmentary sectional view of the therapeutic unit as the same would appear when viewed along line IV—IV of FIG. II, this view revealing the manner in which the motor lead wires and heat pad lead wires are detachably connected to the current input wires;

FIG. V is a fragmentary transverse section of the upper part of the pad assembly and the lower part of the motor containing shell of the motor assembly as the same would appear when viewed along line V—V of FIG. IV, this view further illustrating the manner in which the motor assembly is detachably connected to the pad assembly;

FIG. VI is a fragmentary elevational view of one of the current input wires and its terminal connector in exploded relation to the terminal prong of the current wire which leads to the motor;

FIG. VII is an exploded fragmentary perspective detail which illustrates the manner in which the motor containing shell is detachably connected to the vibration transmitting member or grid of the cushion assembly; and FIG. VIII is a transverse section of the locking ferrule and one of its associated prongs by means of which it is secured to the motor containing shell, this view also showing a transverse section of the marginal bead at the upper part of one of the side panel sections of the outer covering of the cushion assembly as wedge locked within the ferrule by the wedging spline.

Similar reference characters refer to similar parts throughout the several views of the drawings and specification.

Referring to the drawings, the pad or cushion assembly A, as shown in FIGS. I, II and IV, generally comprises a relatively thin vibration transmitting member or grid 1 which is compactly sandwiched between a pair of cushioning slabs 2 and 2' formed of highly resilient material such as foamed rubber latex or foamed synthetic rubber. The adjacent faces of the cushioning slabs 2 and 2' are preferably adhesively bonded to the vibration transmitting member 1 sandwiched therebetween, and are also preferably directly adhesively bonded to each other in those areas thereof which the vibration transmitting member 1 does not cover.

This invention also comprehends the provision of a heating pad 3 which contains a serpentine thermal wire 4 which is surrounded by a resilient cushioning frame 7 formed of highly resilient material such as foamed rubber latex or foamed synthetic rubber. The cushioning slabs 2 and 2' and the vibration transmitting member 1 sandwiched therebetween, as well as the heating pad 3 and its surrounding cushioning frame 7 where a heating pad is used, are snugly encased and enclosed by a snugly fitted envelope covering 8 whose upper ends present bead formations 9.

The motor assembly B includes a variable speed gyratory motor 10 which is cooled by a flow or air propelled by air circulating fans 14 fixed to the projecting ends of its rotor shaft 11. The motor shaft 11 is journaled in self-aligning bearings 12 mounted on the end walls 13' of the motor casing 13. Unbalancing counterweights 15 are connected to the projecting ends of the motor shaft shaft 11 which causes the motor casing 13 to gyrate with an elliptical motion.

The gyratory motor 10 and associated air circulation fans 14 and unbalancing weights 15, are encased within removable housing or shell 17 formed from flexible sheet metal which may be bent to provide a substantially tubular body section which snugly embraces resilient motor mounts or rings 16 extending from the motor casing 13. The motor containing shell 17 presents a pair of flange portions 17' which may be removably connected to the adjacent end of the vibration transmission member 1 readily accessible at the upper end of the cushion assembly A. The tubular body of the motor containing shell 17 is closed by removable end closures 18 which are removably clamped to the ends of the motor containing shell 17 when the flange portions 17' thereof are drawn into abutment.

The terminal end of the motor lead wire 27 is provided with a terminal prong 27' and the terminal end of the motor lead wire 30 is provided with a twin prong device 31 presenting a pair of terminal prongs 31' and 31''. The terminal prongs 27' and 31' are designed to be detachably connected to corresponding socket connectors 28' and 32' at the terminal ends of the current input wires 28 and 32 contained within a tubular insulating casing 36 extending through a fitting collar 36' set within and supported by the adjacent end of the envelope covering 8 of the cushion assembly A. The terminal end of the lead wire 6' extending from one corner of the heating pad 3 is provided with a socket connector 37 designed to be detachably secured to the terminal prong 31'' of the twin prong device 31, and the terminal end of the other lead wire 6 extending from the heating pad 3 is provided with a socket connector 33 designed to be connected to the terminal prong 34' of a third current input wire 34.

The bead formations 9 at the upper ends of the side panel sections 8' which form the outer casing 8 of the cushion assembly A, are detachably secured to a pair of channel shaped ferrules 20 fixedly secured to the motor containing shell 17 adjacent the flange portions 17' thereof, by means of wedging splines 23 driven through one end of the open ends of the channel shaped ferrules 20. The bead formations 9 may be detached from the channel shaped ferrules 20 by applying a driving force to the ends of the wedging splines 23 to thereby drive the splines out of the locking ferrules 20 as shown in FIG. III.

The motor assembly B may be readily detached from the cushion assembly A to render the gyratory motor 10 readily accessible for repair or replacement, by first driving the wedging splines 23 from the channel shaped ferrules 20 so that the bead formations 9 of the outer casing 8 may be separated therefrom, and thereby rendering the flange portions 17' of the motor containing shell 17 readily accessible. The flange portions 17' of the motor containing shell 17 may then be readily detached from the adjacent end of the vibration transmitting member 1 as sandwiched between the resilient cushioning slabs 2—2' of the cushion assembly A. The terminal ends of the motor lead wires 27 and 30 and the terminal ends of the heating pad lead wires 6 and 6' may then be disconnected from the terminal ends of the respective current input wires 28, 32 and 34. The motor assembly B, as thus completely detached from the cushion assembly A, can be then handled as a separate unit, permitting convenient separation of the flange portions 17' of the motor containing shell to thereby expand the shell body, so that the end closure 18 and the motor 10 contained therein may be readily removed.

The pad or cushion assembly A, as shown more particularly in FIGS. I, II, IV and V, comprises a vibration transmitting member or grid 1 which is preferably composed of a series of longitudinally extending bands 1' formed from relatively thin but flexible spring steel or like metal, which may be in the order of one inch in width. The longitudinally extending bands, as shown in FIG. IV, are joined at the lower ends thereof by a flexible transverse band 1''', and at the upper ends thereof by a similar upper transverse band 1'''. The transverse bands 1''' are also preferably composed of relatively thin spring steel measuring approximately one inch in width, and may be secured to the lower and upper ends of the longitudinal bands 1' as by spot welds. Two or more of the intermediate longitudinal bands 1' are provided with end extensions 1'' at the upper end thereof as shown in FIGS. IV and VII, thereby providing a means for securing the vibration transmitting member or grid 1 to the motor containing shell 17 of the motor assembly B.

It will be appreciated that this invention is not limited to the use of a vibration transmitting grid 1 composed only of longitudinal and transverse bands 1' and 1''' made of resilient steel or like resilient metal having spring characteristics, but may comprise a vibration transmitting member composed of flexible longitudinal and horizontal bands made from impregnated fibrous material or plastic; or the vibration transmitting member 1 may be composed of a sheet of metal, or a sheet of fibrous or plastic material. However formed, the vibration transmitting member 1 is relatively flexible in directions normal to the plane thereof but relatively inflexible in a direction parallel to the plane thereof.

The vibration transmitting member or grid 1 is compactly sandwiched between a pair of slabs 2 and 2' formed of highly resilient material such as cellular foamed rubber latex or cellular foamed synthetic rubber. The slab 2 is positioned on one side of the motion transmitting member or grid 1 and is desirably adhesively bonded thereto. The companion highly resilient slab 2' extends over the other face of the vibration transmission member or grid 1 and is also preferably adhesively bonded thereto, and also adhesively bonded to resilient slab 2 in the areas of mutual contact, as between the longitudinally extending bands 1' and the transverse bands 1'''.

The vibration transmitting member or grid 1 preferably has an area, as defined between the outer boundaries thereof, which is only slightly less than the areas of the resilient slabs 2—2' between which the member 1 is sandwiched, with the sides and ends of the slabs 2—2' extending slightly beyond the marginal boundaries of the vibration transmitting member or grids 1 as shown in FIG. IV, and with the end extensions 1'' of the intermediate longitudinal bands 1' extending substantially to the upper margins of the resilient slabs 2—2'. The slab 2 has a preferred thickness of not less than approximately one inch, and substantially no more than two inches. The companion resilient slab 2' may be of corresponding thickness and size, except where a heat pad 3 is to be positioned adjacent the outside surface thereof, in which case the resilient slab 2' may be of corresponding lesser thickness, so that the combined thickness of the resilient slab 2' and the heat pad 3 positioned adjacent the outside surface thereof, substantially equals the thickness of the resilient slab 2, as indicated in FIGS. II and V.

The pad or cushion assembly A may be made in any desired length and width to provide a massage medium corresponding to the full length and width of the human body, and thus used as a massage mattress or mattress pad, or of lesser width and length to provide a massage medium for the back, buttocks, or limbs of the human body only. Where the pad or cushion assembly A is to provide a massage medium sized to effectively massage the full length and width of the human body, or a substantial part thereof, the motor assembly B may contain a gyratory motor 10 of sufficient horsepower to deliver the desired vibratory action to the vibratory transmitting member or grid 1 to which the motor assembly B is removably connected, or if desired, two motor assemblies B arranged in tandem may be connected to the upper end of the vibration transmitting member or grid 1 to effectuate the delivery of the desired degree of elliptical stroke to the vibration transmitting member or grid 1, and thence to the body supporting surface of the massage pad or cushion.

Where heat as well as massage therapy is to be incorporated into the pad or cushion assembly A, a heat pad 3 of substantial area is adhesively bonded to the outer face of the companion resilient slab 2' as shown in FIGS. II, IV and V. The heat pad 3 contains a serpentine thermal wire 4 packed within a relatively thin heat resistant padding 4' and contained within a snugly fitted encasing envelope 5 which may be formed of a suitable natural or synthetic rubber or treated moisture resistant fabric. The serpentine thermal wire 4 contained within the heat pad 3 is joined to a pair of lead wires 6 and 6' which emerge through one corner of the heat pad envelope 5 as shown in FIG. IV.

The heat pad 3 is preferably surrounded by a framing slab 7 as shown in FIGS. II and IV which has a thickness approximately equal to, or slightly thicker than, the thickness of the heat pad 3. The framing slab 7 is preferably composed of a highly resilient material such as foamed rubber latex or foamed synthetic rubber, and is preferably adhesively bonded to the adjacent surface areas of the companion slab 2', with the lead wires 6—6' extending from one corner of the heat pad 3 and sandwiched between the companion slab 2' and the adjacent portion of the framing slab 7 as shown in FIG. II. Where a heat pad 3 is employed, the combined thickness of the heat pad and companion resilient slab 2', and the combined thickness of the framing slab 7 and the companion resilient slab 2', approximately corresponds to the thickness of the resilient slab 2 on the opposite side of the vibration transmitting member or grid 1.

The resilient cushioning slabs 2—2', and the vibration transmitting member or grid 1 compactly sandwiched therebetween, and also the heat pad 3 and resilient framing slab 7 where a heat pad is employed, are compactly encased within an outer covering 8 composed of upholstery leather, upholstry plastic or upholstery fabric, which has substantially no stretch characteristics, and which provides a long wearing covering whose outer surfaces may be readily cleaned. The outer casing 8 may be variously formed to provide a snug fitting sleeve or envelope which can be drawn over the lower ends of the resilient slabs 2—2', and the resilient framing slab 7 and heat pad 3 pocketed therein if the same is employed. Where no heat pad 3 and associated resilient framing slab are employed, the companion resilient slab 2' approximates the thickness of the resilient slab 2 on the opposite side of the vibration transmitting member or grid 1, and the outer covering 8 is then fitted to snugly telescope over the resilient rubber slabs 2—2' as thus formed. In all cases, the resilient slabs 2—2' are preferably maintained under moderate compression by the snugly fitted outer casing 8.

In making the outer covering 8 in the form of a snug fitting outer envelope, the same may be formed from two side panel forming sections 8'—8' whose lower margin and side margins are provided with lower margin and side marginal welts as shown in FIGS. I, II and IV which are stitched together to provide a beading welt 8'' along the lower margin and side margins of the outer covering 8.

An upper marginal beading 9 is also provided at the upper marginal end of each side panel section 8' of the outer covering 8 as shown in FIGS. I, II, V and VIII. Each beading 9, as well as the beadings 8'', may be formed by a small diameter cord or rope which is encased within the rolled edge of the side panel section 8', and suitably stitched to enclose the beading rope. Each upper marginal beading 9 provides the means for securing the upper end of its side panel section 8' to a locking ferrule 20 forming a part of the motor assembly B, thereby also maintaining the side panel section 8' in taut condition.

The open gap between each end of the motor assembly B and the side marginal beadings 8''—8'', is closed by a filler strip 9' as shown in FIG. I, which is preferably composed of the same upholstery material used to form the outer covering 8. The filler strips 9' are tightly drawn over the adjacent upper ends of the resilient cushioning slabs 2—2', with the adjacent margins of each filler strip 9' suitably stitched to the adjacent flared portions of the upper beadings 9, but leaving uncovered those portions of the upper ends of the resilient cushioning slabs 2—2' to be covered and concealed by the motor assembly B as applied thereto.

The motor assembly B as shown in FIGS. I, II and IV comprises a fractional horsepower, variable speed, gyratory motor 10 which preferably operates on either direct or alternating current, and which provides a source of power to vibrate or impart elliptical strokes to the vibration transmitting member or grid 1. The motor shaft 11 which supports the motor rotor, extends through the motor casing 13 which encases and supports the motor stator, and its projecting ends are preferably journaled in self-lubricating and self-aligning bearings 12 mounted in the end walls 13' of the motor casing 13, the casing end walls 13' having suitable ventilating openings 13'' therein. An air circulation fan 14 is fixed to each of the projecting ends of the motor shaft 11 and the vanes thereof are angled to propel a flow of air in the same direction through the ventilating openings 13'' and around the motor casing 13.

Unbalancing weights 15 are also attached to each of the projecting ends of the motor shaft 11. Each set of unbalancing weights 15 may comprise one or more stacked discs of desired weight which are supported by the head portion 15'' of a stud screw 15' threaded into a hub portion 15''' fixed to the adjacent projecting end of the motor shaft 11. The two unbalancing weight supporting screws 15' may extend from the motor shaft 11 in substantially the same plane, or may extend at any desired angle to each other. The unbalancing weights 15 produce a rotary unbalance of the gyratory motor 10 which is substantially in excess of any unbalance due to inaccuracy of manufacture.

When the unbalancing weight supporting stud screws 15' are positioned to extend in substantially the same plane, a substantially planar ellipse form of motion is produced, whose longer action stroke extends lengthwise of and substantially parallel to the plane of the vibration transmitting member 1, and whose shorter action stroke extends in a direction substantially perpendicular to the plane of the vibration transmitting member 1. Where a compound type of elliptical action is desired, the weight supporting stud screws 15' at each end of the motor shaft 11 are positioned to extend at an angle to each other, which causes the motor casing 13 to execute a wobbling action during rotation, producing a compounded form of elliptical motion whose longer action stroke extends longitudinally of and substantially parallel to the plane of the motion transmitting member 1, whose shorter action stroke extends perpendicular to the plane of the vibration transmitting member 1, and whose third action stroke extends in the plane of the vibration transmitting member 1, but in a direction transversely thereof. The self-aligning bearings 12 which support the motor shaft 11 are self-lubricating, substantially frictionless, and ruggedly constructed to withstand the rigors of elliptical motion.

The motor casing 13 is preferably supported by a series of spaced resilient cushioning elements 16, and preferably in the form of a pair of resilient rubber rings as shown in FIGS. II and IV, which surround the motor casing 13 and provide the sole support for the gyratory motor 10. The cushioning rings 16 are encased within a cylindrically shaped housing or shell 17 made from a sheet of relatively thin and flexible metal and presenting a pair of terminal flange portions 17'. The motor containing housing or shell 17 is so shaped and proportioned that, when the terminal flange portions 17' thereof are in substantial abutment as shown in FIG. II, the cylindrical shell will snugly surround and exert a compressive force on the resilient motor supporting rings 16 encased therein. However, when the flange portions 17' of the motor containing shell are separated, the entire motor 10 and its supporting rings 16 may be withdrawn from one end of the motor containing shell 17.

Each open end of the motor containing shell 17 is enclosed by a removable end closure 18 presenting a circular flange portion 18' designed to extend into the adjacent end of the motor containing shell 17. Each end portion of the motor containing shell 17 is provided with a series of ribs or indentations 17'' as shown in FIG. IV, which are designed to interlock with complementary ribs or indentations 18'' presented by the flange portion 18' of each end closure 18, when the flange portions 17' of the motor containing shell are drawn together into substantially abutting relationship. Each of the end closures 18 is provided with adequate ventilating holes 18''' as shown in FIGS. I and III to permit the free circulation of air therethrough as propelled by the fans 14 attached to the motor shaft 11.

The flange portions 17' of the motor containing shell 17 may be maintained in substantially abutting relationship by two or more Tinnerman nuts 25 telescoped thereover as indicated in FIG. VII. When the flange portions 17' of the motor containing shell 17 are thus drawn into abutment, the end closures 18 are locked in fixed position by the cooperating indentations 17'' and 18'' presented by the motor containing shell 17 and the flange portions 18' of the end closures 18. Alternatively, when the Tinnerman nuts 25 are withdrawn, the abutting flange portions 17' will spring outwardly and the motor containing shell 17 will outflare, permitting withdrawal of the end closures 18 as well as the gyratory motor 10 contained therein.

The arcuate body of the motor containing shell 17 is covered by a resilient blanket 19 as shown in FIG. II which may be formed of foamed rubber latex or foamed synthetic rubber. The resilient blanket 19 is encased within a covering sheet 19' of upholstery material such as natural or artificial leather, plastic sheeting or upholstery fabric, and may be formed of the same material as the covering casing 8 of the pad or cushion assembly A. The side margins of the covering sheet 19' may also be provided with stitched trimming beads 19'' which conceal the side edges of the motor containing shell 17, leaving only a small part of the flange portions 18' of the end closures 18 exposed to view as shown in FIG. IV. The resilient padding 19 may be adhesively bonded to the covering sheet 19', and the resilient padding 19 and covering sheet 19' then applied as a unit to the arcuate body of the motor containing shell and secured as by a bonding adhesive thereto. It will be noted that the terminal ends of the resilient padding 19 of the covering sheet 19' as thus applied to the motor containing shell extend adjacent to but slightly short of the flange portions 17' of the motor containing shell.

In assembly, the gyratory motor 10 is positioned within the expanded shell 17, the end closures 18 assembled therewith, and the flange portions 17' are then clamped together by the two or more Tinnerman nuts 25. The abutting flange portions 17' are then inserted into the upper end of the cushion assembly A between the upper beadings 9 thereof as shown in FIG. III. A securing screw 26 is then inserted through a conforming hole 26' in each end extension 1' of the vibration transmitting member 1", into a corresponding receiving hole 26" provided in the adjacent leg 25' of the Tinnerman nut 25, into the receiving hole 26" of the flange portions 17' of the motor containing shell, and then threaded into the nut forming deformation in the companion leg 25" of the Tinnerman nut 25, as indicated in FIGS. V and VII.

The bead formations 9 at the upper ends of the side panel sections 8' which form the outer covering 8 of the cushion assembly, are detachably connected to the motor containing shell 17 as by means of a pair of channel shaped ferrules 20 as shown in FIGS. II, V and VIII. Each of the channel shaped ferrules 20 may be formed of extruded metal such as aluminum and have a length corresponding to the longitudinal length of the motor containing shell 17. Each ferrule 20 includes a web portion 20' presenting friction ribs 20" designed to tightly seat against the outside face of the covering sheet 19' of the motor containing shell 17. Two or more attaching prongs 24 extending from the web portion 20' are projected through the resilient blanket 19 and covering sheet 19' of the motor containing shell 17, with the terminal ends of the prongs 24 inserted into receiving slits formed in the shell wall and then clinched over as shown in FIGS. IV and V and thus firmly secured to the motor containing shell 17. The securing prongs 24 extending from the web portion of the channel shaped ferrules 20 also serve to secure the terminal end portions of the covering sheet 19' and resilient blanket 19 to the motor containing shell 17.

Each channel shaped ferrule 20 also presents an inner flange portion 21 which terminates in an inturned lip 21', and an opposite rolled flange portion 22 within which the bead formation 9 at the upper end of the panel section 8' of the envelope covering 8 may be inserted and pocketed. Each bead formation 9 is locked within the rolled flange portion 22 of its channel shaped ferrule 20 by a wedging spline 23 of generally rectangular cross section, which can be readily driven into the channel shaped ferrule 20 with one side edge thereof in bracing relation against the inner flange portion 21 of the ferrule so that the other side edge of the wedging spline 23 will tightly wedge the bead formation 9 within the pocket formed by the rolled flange portion 22 of the ferrule as indicated in FIG. VIII. The channel shaped ferrules 20 are secured to the motor containing shell 17 in the position shown in FIGS. III and V; and when the bead formations 9 are wedge locked therein by the wedging splines 23, the side panel sections 8' of the outer covering 8 of the cushion assembly A are snugly and tautly drawn over the cushioning slab 2 and the cushioning slab 2', or over the cushioning slab 2 and the heating pad 3 and resilient cushioning frame 7, as indicated in FIG. V.

The gyratory motor 10 has a pair of current lead wires 27 and 30 extending therefrom as shown in FIG. IV, which are encased within a flexible tubular insulating conduit 30' which projects through a suitable conforming hole 30" in the motor containing shell 17 adjacent one of the flange portions 17' thereof. Current is supplied to the gyratory motor 10 by a pair of power input wires 28 and 32 as shown in FIG. IV, contained within a flexible tubular insulating conduit 36. The input wires 28 and 32 in the input conduit 36 are connected to either a direct or alternating power source through a suitable control box (not shown) which contains instruments for controlling the rotative speed and time of running of the variable speed gyratory motor 10. Where a heating pad 3 also forms a part of the pad or cushion assembly A, an input wire 34 is also contained within the insulating conduit 36 and which is connected to a heat regulator switch which may be contained in the control box (not shown). The tubular input conduit 36 and input wires 28, 32 and 34 contained therein, is inserted through a suitable fitting collar 36' which extends through and is fixed to one of the filler covers 9' of the cushion assembly A as shown in FIG. IV. The insulating conduit 36 and the input wires 28, 32 and 34 contained therein may be withdrawn from the fitting collar 36' and separated from the pad or cushion assembly A, as will be evident from the explanation given below.

Means are provided to permit convenient connection and disconnection of the motor lead wires 27 and 30 from the current input wires 28 and 32, and also to permit convenient connection and disconnection of the heat pad lead wires 6 and 6' from the current input wires 32 and 34. As shown in FIG. IV, the motor lead wire 27 has a terminal prong 27' at the end thereof which may be readily connected to and disconnected from a socket connector 28' fixed to the terminal end of the input wire 28. The terminal prong 27' and socket connector 28' may be constructed as illustrated in FIG. VI, and the connection then protected by sliding an insulating sleeve 29 thereover. The terminal end of the other motor lead wire 30 is connected to a twin prong device 31, one of whose prongs 31' is detachably connected to a socket connector 32' at the terminal end of the current input wire 32.

The other prong 31" of the twin prong device 31 is detachably connected to a socket connector 37 at the terminal end of the lead wire 6' extending from the heating pad 3. The other lead wire 6 from the heating pad has a socket connector 33 at the end thereof, which is detachably connected to a terminal prong 34' fixed to the terminal end of the input wire 34, and the connected terminal prong 33 and socket connector 34' protected by a sliding insulating sleeve 35. The twin pronged device 31 and the socket connectors 32' and 37 when connected may be protected by a sliding insulating sleeve 38.

From the above description, taken together with the drawing illustrations shown in FIGS. II and IV, it is evident that the motor lead wires 27 and 30, the heating pad lead wires 6—6' and the current input wires 28, 32 and 34 are contained in and fully insulated by insulating conduits; and the terminal prongs 27', 31', 31" and 34' and their associated socket connectors 28', 32', 37 and 33 are also fully insulated by slidable insulating sleeves 29, 35 and 38. Additionally, all terminal prongs and their associated socket connectors are fully separated and insulated from the motion transmitting member or grid 1 and the motor containing shell 17, in a manner to meet the most rigid wiring specifications, by the non-conductive mounting panel 39 on which the terminal prongs and associated socket connectors are supported.

The motor assembly B may be readily removed as an integral unit from the cushion assembly A by withdrawing the wedging splines 23 from the locking ferrules, which permits detachment of the upper beadings 9 of the cushion envelope covering 8 from the locking ferrules 20. The securing screws 26 are then rendered readily accessible for withdrawal to permit detachment of the flange portions 17' of the motor containing shell 17 from the end extensions 1" of the motion transmitting grid 1. The opening thus provided between the upper beads 9 of the cushion envelope covering 8, renders the terminal prongs and the socket connectors readily accessible for detachment, so that the motor assembly B can be completely removed from the cushion assembly A as an integral unit. Upon withdrawal of the Tinnerman nuts 25 from the abutting flange portions 17' of the motor containing shell 17, the arcuate body section of the motor containing shell can be readily outflared to permit ready removal of the motor and its lead wires 27 and 30.

The deficient gyratory motor 10 may then be sent to the factory for repair, or an available replacement motor substituted therefor which is placed within the expanded tubular body section of the motor containing shell 17, the end closures 18 placed in position, the flange portions 17' of the shell clamped into abutting relationship by the application of Tinnerman nuts 25, the terminal prongs 27' and 31' of the motor lead wires 27 and 30 respectively connected to the socket connectors 28' and 32', the upper beads 9 of the cushion covering 8 then pocketed within the locking ferrules 20 and the wedging splines 23 replaced.

The pad assembly A and the motor assembly B may be manufactured and assembled as complete units before they are brought together in operative assembly, which further facilitates the precision manufacture of these highly effective therapeutic massage cushions, with minimum labor and at economical cost. In addition, defective motors can be removed and replacement motors substituted in the field quickly and expeditiously, by relatively unskilled workmen, and so that the fully repaired therapeutic massage unit may be promptly returned to the owner-user in minimum time and with minimum inconvenience.

The term "cushion" as used in the claims is intended to embrace cushions, pads, mattresses and mattress pads of any desired length, width and thickness dimension. While certain novel features of this invention have been disclosed herein and are pointed out in the claims, it will be understood that various omissions, substitutions, and changes may be made by those skilled in the art without departing from the spirit of this invention.

What is claimed is:

1. A therapeutic massage unit including in combination, a motor assembly designed to be detachably connected to one end of a cushion assembly; said cushion assembly including a vibration transmitting member compactly sandwiched between a pair of resilient cushioning slabs which are enclosed within an envelope covering, said vibration transmitting member terminating adjacent one end of said resilient cushioning slabs with the adjacent end of said envelope covering presenting a pair of spaced bead formations; said motor assembly including a gyratory motor, a housing shell formed from flexible sheet material presenting a flexible tubular body section terminating in laterally extending flange portions, the tubular body section of said shell being designed to enclose and support the gyratory motor therein when said flange portions are drawn into substantially abutting relationship, means for drawing said flange portions substantially into abutment and securing said flange portions to the adjacent end of the vibration transmitting member of said cushion assembly, a pair of channel shaped locking members secured to the motor containing shell and each designed to receive the bead formation extending along the adjacent edge of said envelope covering, and a removable wedging spline inserted into each of said channel shaped members to thereby detachably secure said bead formation thereto.

2. A therapeutic massage unit including in combination, a motor assembly designed to be detachably connected to one end of a cushion assembly; said cushion assembly including a vibration transmitting member compactly sandwiched between a pair of resilient cushioning slabs which are enclosed within an envelope covering, said vibration transmitting member terminating adjacent one end of said resilient cushioning slabs with the adjacent end of said envelope covering presenting a pair of spaced bead formations; said motor assembly including a gyratory motor, a housing shell formed from flexible sheet material presenting a flexible tubular body section terminating in laterally extending flange portions, the tubular body section of said shell being designed to enclose and support the gyratory motor therein when said flange portions are drawn into substantially abutting relationship, a resilient blanket and an upholstery covering extending around the tubular body section of said shell and terminating adjacent the flange portions thereof, means for drawing said flange portions substantially into abutment and securing said flange portions to the adjacent end of the vibration transmitting member of said cushion assembly, a pair of channel shaped locking members secured to the motor containing shell and each designed to receive the bead formation extending along the adjacent edge of said envelope covering, and a removable wedging spline inserted into each of said channel shaped members to thereby detachably secure said bead formations thereto.

3. A therapeutic massage unit including in combination, a motor assembly designed to be detachably connected to one end of a cushion assembly; said cushion assembly including a vibration transmitting member compactly sandwiched between a pair of resilient cushioning slabs which are enclosed within an envelope covering, said vibration transmitting member having end extensions terminating adjacent one end of said resilient cushioning slabs with the adjacent end of said envelope covering presenting a pair of spaced bead formations; said motor assembly including a gyratory motor, a housing shell formed from flexible sheet material presenting a flexible tubular body section terminating in laterally extending flange portions, the tubular body section of said shell being designed to enclose and support the gyratory motor therein when said flange portions are drawn into substantially abutting relationship, means for drawing said flange portions substantially into abutment and securing said flange portions to the adjacent end extensions of the vibration transmitting member of said cushion assembly, a pair of channel shaped ferrules secured to the tubular body section of said motor enclosing shell adjacent the flange portions thereof, each of said channel shaped ferrules presenting a web and a pair of spaced flanges one of which provides a pocket designed to receive said bead formation of the envelope covering, and a removable wedging spline inserted into each of said channel shaped ferrules between said bead formation and the opposite flange of said ferrule to thereby detachably secure the bead formation thereto.

4. A therapeutic massage unit including in combination, a motor assembly designed to be detachably connected to one end of a cushion assembly; said cushion assembly including a vibration transmitting member compactly sandwiched between a pair of resilient cushioning slabs which are enclosed within an envelope covering, said vibration transmitting member terminating adjacent one end of said resilient cushioning slabs with the adjacent end of said envelope covering presenting a pair of spaced bead formations; said motor assembly including a gyratory motor, a housing shell formed from flexible sheet material presenting a flexible tubular body section terminating in laterally extending flange portions, the tubular body section of said shell being designed to enclose and support the gyratory motor therein when said flange portions are drawn into substantially abutting relationship, an end closure for each end of the tubular body section of said shell, each of said end closures having a substantially circular flange extending therefrom designed to interfit with the end portion of the tubular body section when the flange portions of said shell are substantially in abutment, means for drawing said flange portions substantially into abutment and securing said flange portions to the adjacent end of the vibration transmitting member of said cushion assembly, a pair of channel shaped locking members secured to the motor containing shell and each designed to receive the bead formation extending along the adjacent edge of said envelope covering, and a removable wedging spline inserted into each of said channel shaped members to thereby detachably secure said bead formation thereto.

5. A therapeutic massage unit including in combination, a motor assembly designed to be detachably connected to one end of a cushion assembly; said cushion assembly including a vibration transmitting member compactly sandwiched between a pair of resilient cushioning slabs which are enclosed within an envelope covering, said vibration transmitting member terminating adjacent one end of said resilient cushioning slabs with the adjacent end of said envelope covering presenting a pair of spaced bead formations; said motor assembly including a gyratory motor, a housing shell formed from flexible sheet material presenting a flexible tubular body section terminating in laterally extending flange portions, the tubular body section of said shell being designed to enclose and support the gyratory motor therein when said flange portions are drawn into substantially abutting relationship, an end closure for each end of the tubular body section of said shell, each of said end closures having a substantially circular flange portion extending therefrom designed to interfit with the end portion of the tubular body section when the flange portions of said shell are substantially in abutment, locking elements presented by the flange portion of each end closure designed to interlock with complementary locking elements presented by the adjacent end portion of the tubular body section of said shell, means for drawing said shell flange portions substantially into abutment and securing said shell flange portions to the adjacent end of the vibration transmitting member of said cushion assembly, a pair of channel shaped ferrules secured to the tubular body section of said motor enclosing shell adjacent the flange portions thereof, each of said channel shaped ferrules presenting a web and a pair of flanges one of which provides a pocket designed to receive the adjacent upper bead formation of the envelope covering, and a removable wedging spline inserted into each of said channel shaped ferrules to thereby detachably secure the bead formation therein.

6. A therapeutic massage unit including in combination, a motor assembly designed to be detachably connected to one end of a cushion assembly; said cushion assembly including a vibration transmitting member compactly sandwiched between a pair of resilient cushioning slabs which are enclosed within an envelope covering, said vibration transmitting member terminating adjacent one end of said resilient cushioning slabs with the adjacent end of said envelope covering presenting a pair of spaced bead formations; said motor assembly including a gyratory motor, a housing shell formed from flexible sheet material and presenting a flexible tubular body section terminating in laterally extending flange portions, the tubular body section of said shell being designed to contain and support the gyratory motor therein when said flange portions are drawn into substantially abutting relationship, means for drawing said flange portions substantially into abutment and detachably securing said flange portions to the adjacent end of the vibration transmitting member of said cushion assembly, lead wires extending from the gyratory motor through the motor supporting shell and designed to project into the adjacent end of said cushion assembly, current input wires extending through the adjacent end of the cushion assembly, terminal prongs and socket connectors associated with the terminal ends of said motor lead wires and said current input wires and designed to be pocketed within the adjacent end of said cushion assembly, a pair of locking members of channel shaped form secured to the motor containing shell and designed to receive the bead formations extending along the adjacent edges of said envelope covering, and removable wedging splines inserted into said channel shaped locking members to thereby detachably lock said bead formations thereto.

7. A therapeutic massage unit including in combination, a motor assembly designed to be detachably connected to one end of a cushion assembly; said cushion assembly including a vibration transmitting member compactly sandwiched between a pair of resilient cushioning slabs which are enclosed within an envelope covering, said vibration transmitting member terminating adjacent one end of said resilient cushioning slabs with the adjacent end of said envelope covering presenting a pair of spaced bead formations; and an insulating panel formed from non-conducting material positioned between said terminal end of the vibration transmitting member and the adjacent cushioning slab; said motor assembly including a gyratory motor, a housing shell formed from flexible sheet material and presenting a flexible tubular body section terminating in laterally extending flange portions, the tubular body section of said shell being designed to contain and support the gyratory motor therein when said flange portions are drawn into substantially abutting relationship, means for drawing said flange portions substantially into abutment and detachably securing said flange portions to the adjacent end of the vibration transmitting member of said cushion assembly, lead wires extending from the gyratory motor through said shell and designed to project into the adjacent end of said cushion assembly, current input wires extending through the adjacent end of the cushion assembly, terminal prongs and socket connectors associated with the terminal ends of said motor lead wires and said current input wires and designed to be pocketed between said insulating panel and the adjacent cushioning slab of said cushion assembly, a pair of locking members of channel shaped form secured to the motor containing shell and designed to receive the bead formations extending along the adjacent edges of said envelope covering, and removable wedging splines inserted into said channel shaped locking members to thereby detachably lock said bead formations thereto.

8. A therapeutic massage unit including in combination, a motor assembly designed to be detachably connected to one end of a cushion assembly; said cushion assembly including a vibration transmitting member compactly sandwiched between a pair of resilient cushioning slabs, an electric heating pad surrounded by a resilient cushioning frame positioned against the outside face of one of said resilient cushioning slabs, and an envelope covering snugly enclosing said heating pad, cushioning frame and cushioning slabs and the vibration transmitting member sandwiched therebetween, said vibration transmitting member terminating adjacent one end of said resilient cushioning slabs with the adjacent end of said envelope covering presenting a pair of spaced bead formations; said motor assembly including a gyratory motor, a housing shell formed from flexible sheet material and presenting a flexible tubular body section terminating in laterally extending flange portions, the tubular body section of said shell being designed to contain and support the gyratory motor therein when said flange portions are drawn into substantially abutting relationship, means for drawing said flange portions substantially into abutment and detachably securing said flange portions to the adjacent end of the vibration transmitting member of said cushion assembly, lead wires extending from the gyratory motor through said shell and designed to project into the adjacent end of said cushion assembly, lead wires extending from said electric heating pad to the adjacent end of said cushion assembly, current input wires extending through the adjacent end of the cushion assembly, terminal prongs and socket connectors associated with the terminal ends of said motor lead wires, heating pad lead wires and current input wires and designed to be pocketed within the adjacent end of said cushion assembly, a pair of locking members of channel shaped form secured to the motor containing shell and designed to receive the bead formations extending along the adjacent edges of said envelope covering, and removable wedging splines inserted into said channel shaped locking members to thereby detachably lock said bead formations thereto.

9. A therapeutic massage unit including in combination, a motor assembly designed to be detachably connected to one end of a cushion assembly; said cushion assembly including a vibration transmitting member compactly sandwiched between a pair of resilient cushioning slabs, an electric heating pad surrounded by a resilient cushioning frame positioned against the outside face of one of said resilient cushioning slabs, an envelope covering snugly enclosing said heating pad, cushioning frame and cushioning slabs and the vibration transmitting member sandwiched therebetween, said vibration transmitting member terminating adjacent one end of said resilient cushioning slabs with the adjacent end of said envelope covering presenting a pair of spaced bead formations, and an insulating panel formed from non-conducting material positioned between said terminal end of the vibration transmitting member and the adjacent cushioning slab; said motor assembly including a gyratory motor, a housing shell formed from flexible sheet material and presenting a flexible tubular body section terminating in laterally extending flange portions, the tubular body section of said shell being designed to contain and support the gyratory motor therein when said flange portions are drawn into substantially abutting relationship, means for drawing said flange portions substantially into abutment and detachably securing said flange portions to the adjacent end of the vibration transmitting member of said cushion assembly, lead wires extending from the gyratory motor through said shell and designed to project into the adjacent end of said cushion assembly, lead wires extending from said electric heating pad to the adjacent end of said cushion assembly, current input wires extending through the adjacent end of the cushion assembly, terminal prongs and socket connectors associated with the terminal ends of said motor lead wires, heating pad lead wires and current input wires and designed to be pocketed between said insulating panel and the adjacent cushioning slab of said cushion assembly, a pair of locking members of channel shaped form secured to the motor containing shell and designed to receive the bead formations extending along the adjacent edges of said envelope covering, and removable wedging splines inserted into said channel shaped locking members to thereby detachably lock said bead formations thereto.

References Cited in the file of this patent

UNITED STATES PATENTS

| | | |
|---|---|---|
| 1,683,206 | Pfeiffer | Sept. 4, 1928 |
| 2,774,952 | Batcheller | Dec. 18, 1956 |
| 2,800,897 | Ross | July 30, 1957 |
| 2,852,020 | Murphy | Sept. 16, 1958 |